(12) United States Patent
Stuckey et al.

(10) Patent No.: US 10,807,699 B1
(45) Date of Patent: Oct. 20, 2020

(54) COMPOSITE STRINGER END CAP

(71) Applicant: Spirit AeroSystems, Inc., Wichita, KS (US)

(72) Inventors: Michael J. Stuckey, Wichita, KS (US); Brian Charles Clapp, Goddard, KS (US); Aaron Rae Heitmann, Andover, KS (US); Darin Clay Wiley, Wellington, KS (US); James Edward Westerman, Derby, KS (US); Blaise Francis Bergmann, Clearwater, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 16/435,652

(22) Filed: Jun. 10, 2019

(51) Int. Cl.
  B64C 3/18 (2006.01)
  B64C 1/06 (2006.01)
  B64C 3/26 (2006.01)

(52) U.S. Cl.
  CPC .............. B64C 3/182 (2013.01); B64C 1/061 (2013.01); B64C 3/26 (2013.01)

(58) Field of Classification Search
  CPC .................... B65D 19/00; B65D 19/20; B65D 2519/00935; B65D 2519/00054; B65D 2519/00089; B65D 2519/00124; B65D 2519/00303; B65D 2519/00358; B65D 2519/00388; B65D 2519/00034
  USPC ... 108/51.11, 57.25, 51.3, 53.1, 57.27, 57.28
  See application file for complete search history.

(56) References Cited

U.S. PATENT DOCUMENTS

| | | | | |
|---|---|---|---|---|
| 2,651,486 A | * | 9/1953 | Woodward | B65D 19/0095 108/57.1 |
| 2,774,490 A | * | 12/1956 | Strong | B65D 71/0092 206/598 |
| 3,036,802 A | * | 5/1962 | Kitchell | B65D 19/0081 108/51.3 |
| 3,112,715 A | * | 12/1963 | Callahan | B65D 19/0048 108/51.3 |
| 3,581,681 A | * | 6/1971 | Newton | B65D 19/0018 108/57.28 |
| 3,720,176 A | * | 3/1973 | Munroe | B65D 19/0051 108/57.25 |
| 3,982,057 A | * | 9/1976 | Briggs | B32B 3/12 428/73 |
| 4,293,605 A | * | 10/1981 | Persson | B65G 1/14 108/51.3 |
| 4,715,294 A | * | 12/1987 | Depew | B65D 19/0095 108/57.1 |
| 5,320,048 A | * | 6/1994 | Feiner | B65D 19/0016 108/51.11 |
| 5,476,048 A | * | 12/1995 | Yamashita | B65D 19/0012 108/57.28 |

(Continued)

Primary Examiner — Jose V Chen
(74) Attorney, Agent, or Firm — Hovey Williams LLP

(57) ABSTRACT

An aircraft panel assembly including a panel, a number of open-ended composite stringers, and a number of stringer end caps. Each stringer end cap covers an open end of one of the stringers and includes a base, a vertically extending wall, and an overlap section. The base is bonded to the panel near the open end of the stringer. The vertically extending wall is angled upward from the base and includes an upper periphery. The overlap section extends horizontally from the upper periphery and is bonded to the stringer near the open end of the stringer.

16 Claims, 4 Drawing Sheets

(56) References Cited

U.S. PATENT DOCUMENTS

| | | | | |
|---|---|---|---|---|
| 5,551,353 | A * | 9/1996 | Fiedler | B29D 99/001 108/51.3 |
| 5,890,437 | A * | 4/1999 | Hill | B65D 19/0026 108/51.11 |
| 6,558,093 | B1 * | 5/2003 | Arnold | B65D 19/0077 108/55.3 |
| 6,758,148 | B2 * | 7/2004 | Torrey | B65D 19/0004 108/51.11 |
| 7,597,053 | B2 * | 10/2009 | Muyskens | B65D 19/0002 108/51.11 |
| 8,468,955 | B2 * | 6/2013 | Durco | B65D 19/0012 108/57.31 |
| 8,601,954 | B1 * | 12/2013 | Steinbok | A47B 3/06 108/11 |
| 2001/0050034 | A1 * | 12/2001 | Gross | B65D 19/0081 108/51.11 |
| 2004/0159266 | A1 * | 8/2004 | Fisch | B65D 19/0036 108/57.25 |
| 2006/0254473 | A1 * | 11/2006 | Creighton | B65D 19/36 108/51.11 |
| 2008/0098935 | A1 * | 5/2008 | Roth | B65D 19/0073 108/57.17 |
| 2014/0251190 | A1 * | 9/2014 | Kessler | B65D 19/38 108/57.25 |

* cited by examiner

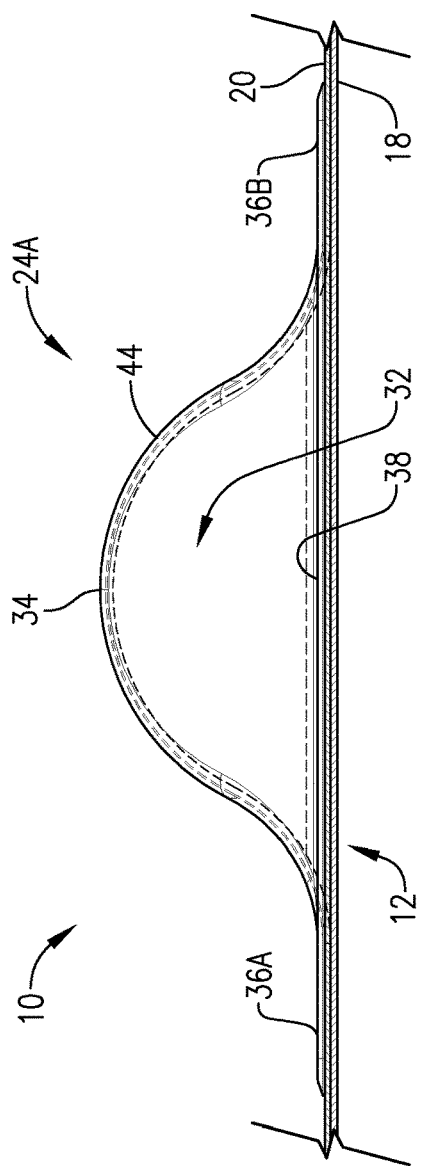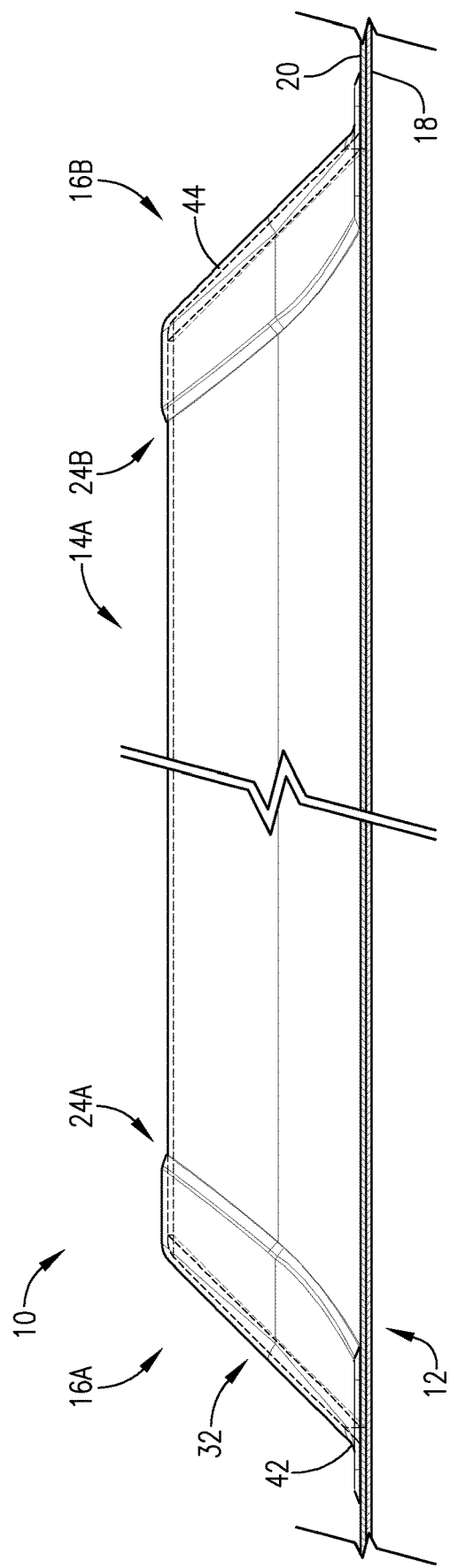

COMPOSITE STRINGER END CAP

BACKGROUND

A stringer is a stiffening member of a vehicle, such as an aircraft, that strengthens skin of the vehicle against buckling under compression or shear loads. Exemplary stringers may extend along and be joined to an inner surface of aircraft skin of a wing or fuselage to reduce bending. Aerodynamic loads acting on the skin may also be transferred to frames, formers, ribs, and/or spars or the like via the stringers.

Composite stringers may have any of various cross-sectional shapes such as "hat"-style, trapezoidal, or curved. Composite stringers often have open ends, which are susceptible to impact damage during their service life. Moisture and debris can also easily enter the open ends, causing damage to the composite stringers, which is difficult to detect upon visual inspection.

Furthermore, composite stringer ends are typically beveled to reduce weight and/or improve their appearance, which can be achieved one of two ways. A first way is to pre-cut composite stringer material so the composite stringer ends have final bevel dimensions when the composite stringer material is laid up and cured, but this increases tooling and manufacturing costs. A second way is to lay up and cure un-cut composite stringer material and machine the composite stringer ends to final bevel dimensions thereafter, which is not practical due to intimate contact of the composite stringer ends with skin plies and the potential for damage to the skin plies.

SUMMARY

Embodiments of the invention solve the above-mentioned problems and other problems and provide a distinct advance in the art of composite panel stringers. More particularly, embodiments of the invention provide an aircraft panel assembly having composite stringer end caps for protecting open stringer ends and for eliminating the need to manufacture the open stringer ends to specific dimensions.

An embodiment of the aircraft panel assembly broadly comprises a panel, a number of spaced apart stringers, and a number of stringer end caps. The panel may be a composite skin panel for an aircraft fuselage, wing, control surface, or the like.

The stringers are elongated rib-like structures for strengthening the panel. Each stringer comprises a middle portion, left and right sides, and opposed open ends. The stringers may have a top hat cross section, a trapezoidal cross section, a curved cross section, or any other suitable cross section. Each stringer may be filled with a core material or may be hollow.

The end caps are positioned on the open ends of the stringers to protect the open ends and to eliminate the need for manufacturing the open ends to specific dimensions. Each end cap includes a base, a vertically extending wall, and an overlap section. The end caps may be formed of composite thermoset materials, thermoplastic composite materials, and/or metallic materials.

The base of the end cap overlays flat portions of the panel near one of the open ends of the stiffener and includes left and right tabs and an intermediate section. The left and right tabs extend laterally from the overlap section and the intermediate section. The intermediate section extends between the left and right tabs along a lower end of the vertically extending wall. The base may have a chamfered edge to form a smooth transition between the end cap and nearby portions of the panel.

The vertically extending wall extends laterally over the open end of the stiffener and includes a lower end and an upper periphery. The vertically extending wall may be angled to match an angle of the open end and may have a vertical profile corresponding to the shape of the middle portion and left and right sides of the stringer.

The lower end meets the intermediate section of the base so as to form a seamless transition between the base and the vertically extending wall. To that end, the lower end may have a concave curve or flare. The lower end also meets opposing ends of the upper periphery on opposite sides of the vertically extending wall near the left and right tabs of the base.

The upper periphery meets the overlap section so as to form a seamless transition between the overlap section and the vertically extending wall. To that end, the upper periphery may have a convex curve or flare. The upper periphery also meets opposing ends of the lower end on opposite sides of the vertically extending wall near the left and right tabs of the base.

The overlap section extends horizontally from the upper periphery of the vertically extending wall so as to cover a portion of the stringer near the open end. The overlap section may have a contour corresponding to the shape of the middle portion and left and right sides of the stringer. For example, the overlap section may have a convex middle portion and concave left and right portions.

The end caps may be fabricated separately from the stringer and then co-bonded or secondarily bonded onto the stringer. End cap fabrication may include additive manufacturing (i.e., 3D printing), injection molding, composite layup and cure, or any other suitable manufacturing method. The end caps may also be configured to be co-cured onto the panel via discrete plies of thermoset material.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is an end elevation view of the stringer end cap of FIG. 2; and

FIG. 5 is a side elevation view of the stringer of FIG. 3.

Figure 1:
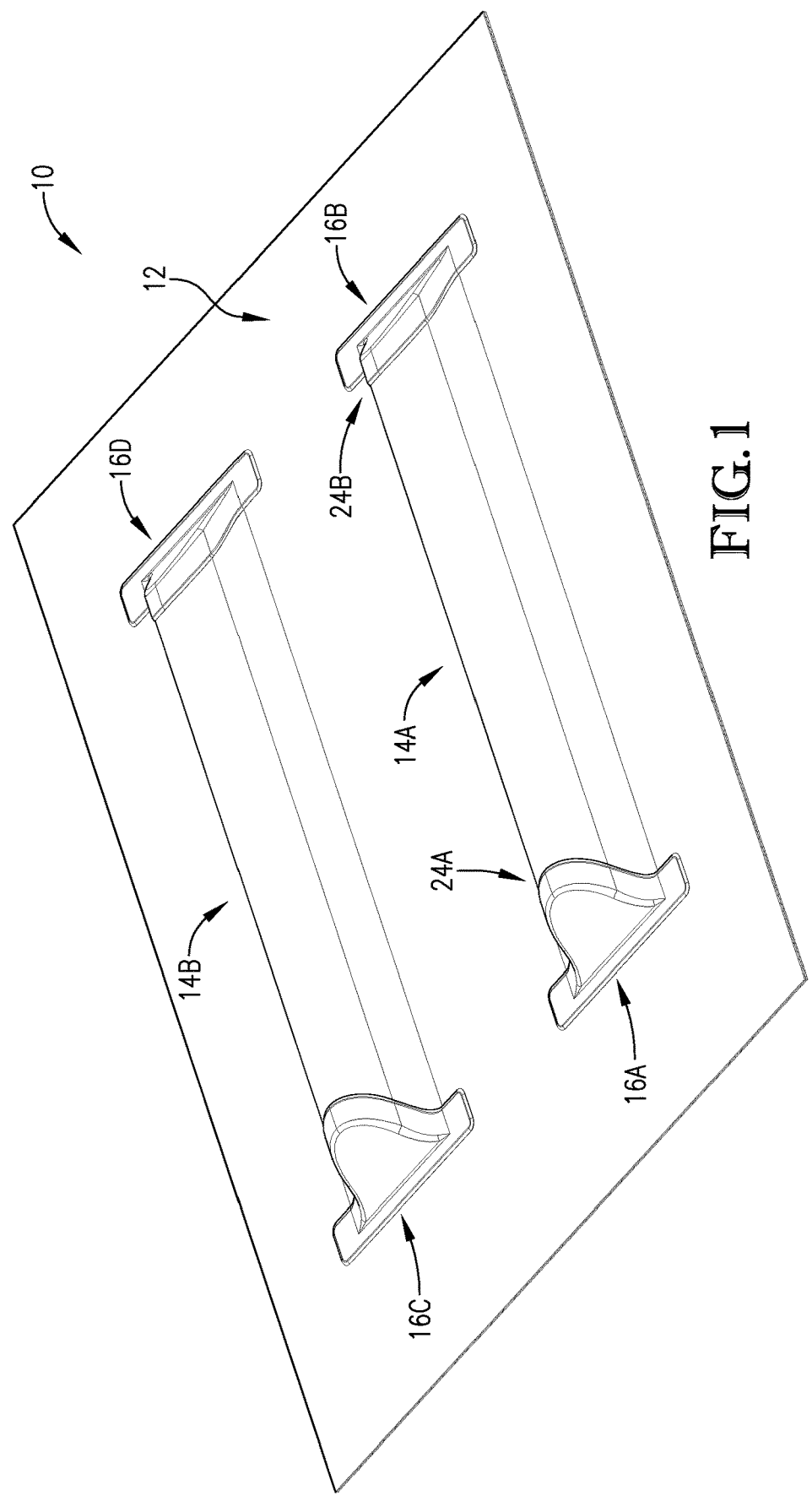
FIG. 1 is a perspective view of an aircraft panel constructed in accordance with an embodiment of the invention.
Figure 2:
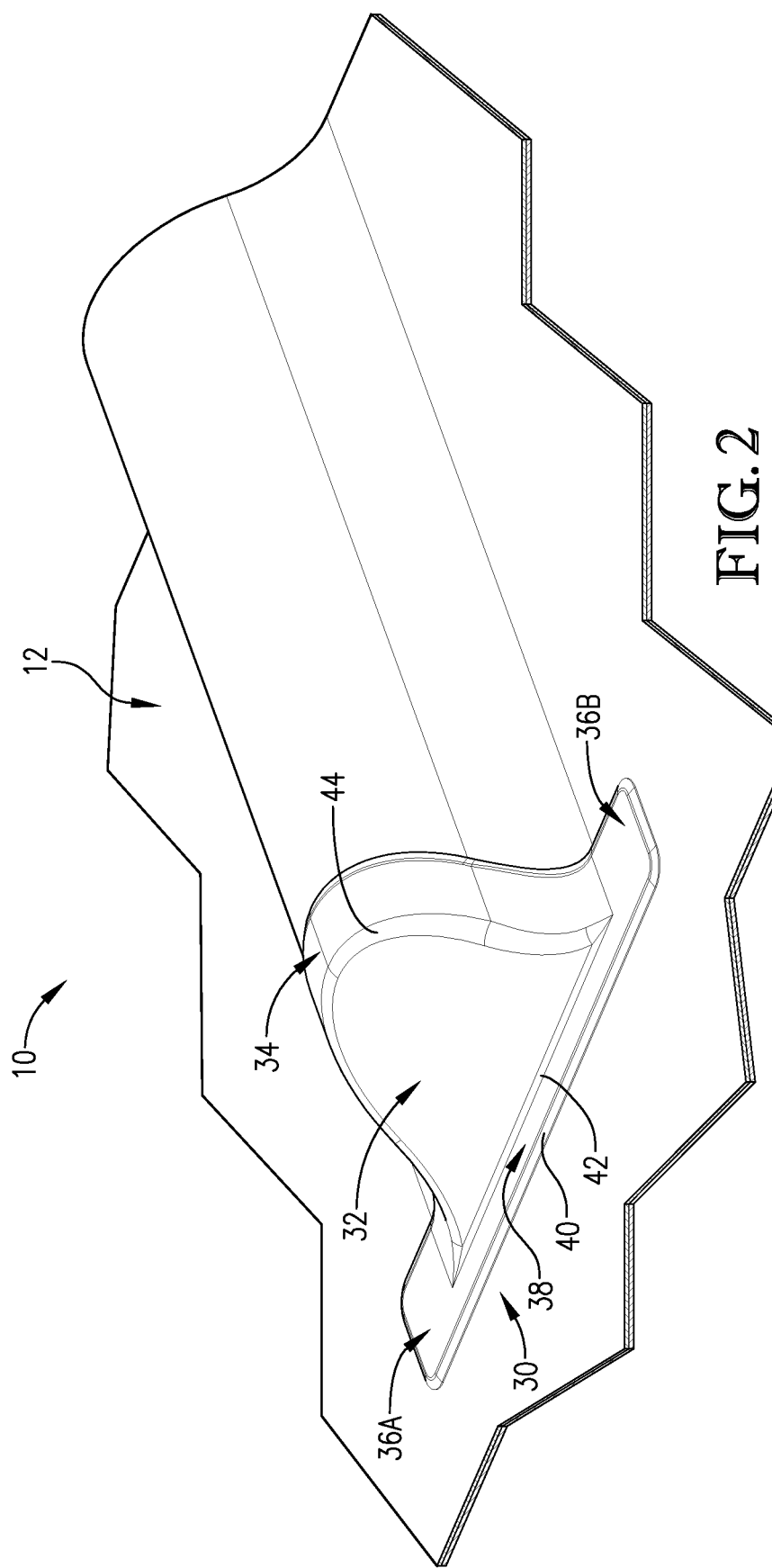
FIG. 2 is an enlarged perspective view of a stringer end cap of the aircraft panel of FIG. 1.
Figure 3:
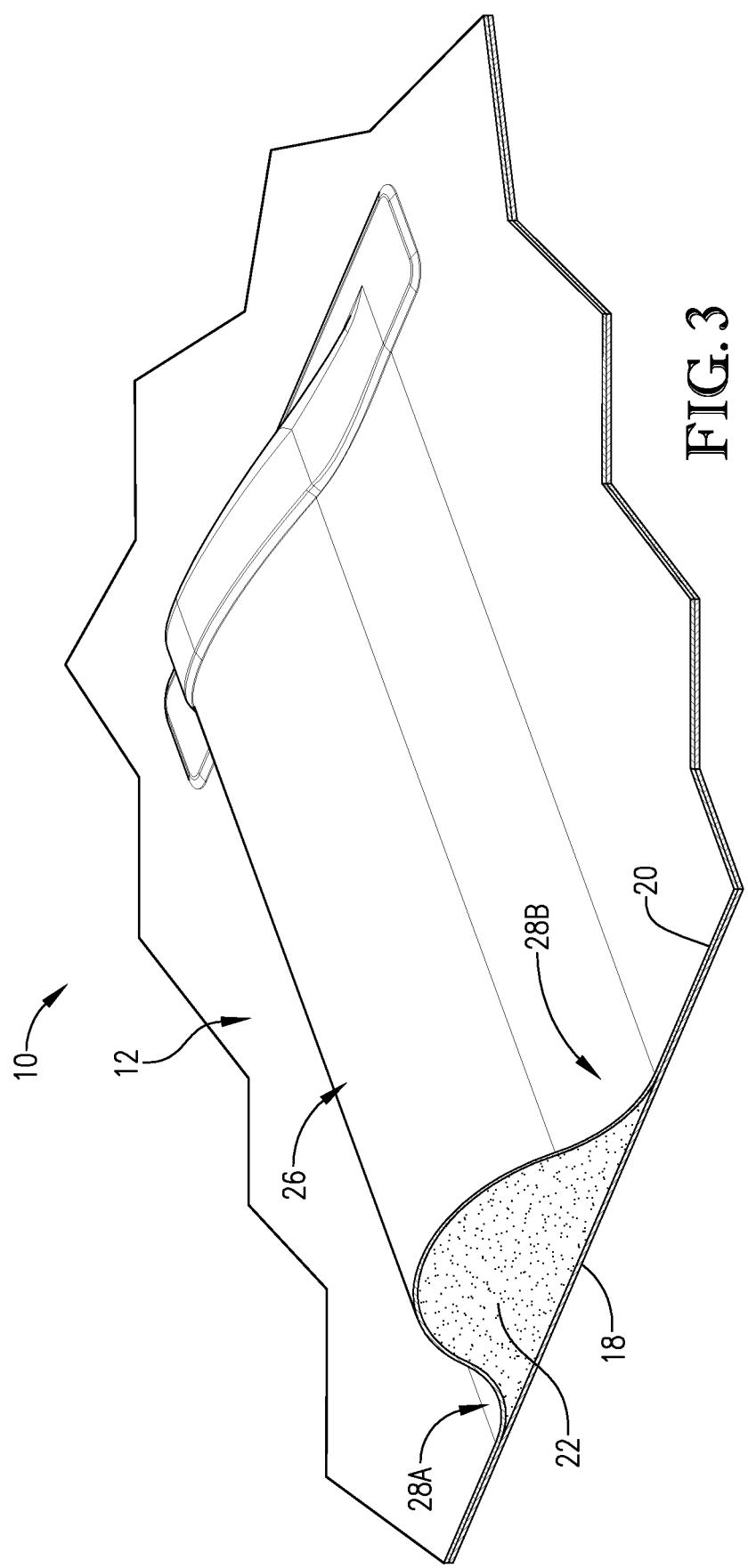
FIG. 3 is a perspective cutaway view of a stringer of the aircraft panel of FIG. 1.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning to the drawing figures, an aircraft panel assembly 10 constructed in accordance with an embodiment of the invention is illustrated. The aircraft panel assembly 10 broadly comprises a panel 12, a plurality of stringers 14A,B and a plurality of stringer end caps 16A-D.

The panel 12 includes a composite skin having a plurality of layers (e.g., first and second layers 18, 20). The panel 12 may be part of a fuselage, wing, control surface, or the like. The second layer 20 may be bonded to the first layer 18 except in regions in which the second layer 20 forms the stringers 14A,B.

The stringers 14A,B are elongated rib-like structures formed via one or more layers of the panel 12 (e.g., second layer 20) for strengthening the panel 12. The stringers 14A,B are substantially similar to each other so only stringer 14A will be described in detail.

Stringer 14A includes opposing open ends 24A,B and defines a middle portion 26 and left and right sides 28A,B. Stringer 14A may have a top hat cross section, a trapezoidal cross section, a curved cross section (as shown), or any other suitable cross section. Stringer 14A may be filled with a core material 22 or may be hollow. In some embodiments, stringer 14A may be separate piece of material bonded to or attached to the panel 12.

The opposing open ends 24A,B are substantially similar to each other so only open end 24A will be described in detail. Open end 24A may be angled toward the opposite open end 24B, as best seen in FIG. 5. In one embodiment, the open end 24A is angled between approximately 30 degrees and approximately 60 degrees. Open end 24A may have smooth curves (i.e., no points or grooves) so as to minimize stresses in the stringer 14A.

The middle portion 26 is the uppermost section of the stringer 14A and may be substantially convex. The middle portion 26 may have a substantially constant curvature radius or may have a graduated curvature radius.

The left and right sides 28A,B extend downward and outward from the middle portion 26 to nearby portions off the aircraft panel 12 and may be substantially concave, The left and right sides 28A,B may have a substantially constant curvature radius or may have a graduated curvature radius. The left and right sides 28A,B may connect directly to the middle portion 26 at an inflection point or may be spaced from the middle portion 26 via substantially flat intermediate regions or other intervening features.

The end caps 16A-D are positioned on the open ends 24A,B of the stringers 14A,B to protect the open ends 24A,B and to eliminate the need to manufacture the open ends 24A,B to specific dimensions. The end caps 16A-D are substantially similar so only end cap 16A will be described in detail.

The end cap 16A includes a base 30, a vertically extending wall 32, and an overlap section 34. The end cap 16A may be a composite part formed of a thermoset material, a thermoplastic composite material, and/or a metallic material.

The base 30 overlays flat portions of the panel 12 near the open end 24A and includes left and right tabs 36A,B and an intermediate section 38. The left and right tabs 36A,B extend laterally from the overlap section 34 and the intermediate section 38. The intermediate section 38 extends between the left and right tabs 36A,B along a lower end of the vertically extending wall 32. The base may have a chamfered edge 40 to form a smooth transition between the end cap 16A and nearby portions of the panel 12.

The vertically extending wall 32 extends laterally over the open end 24A and includes a lower end 42 and an upper periphery 44. The vertically extending wall 32 may be angled to match the angle of the open end 24A and may have a vertical profile corresponding to the shape of the middle portion 26 and left and right sides 28A, B of the stringer 14A.

The lower end 42 meets the intermediate section 38 of the base 30 so as to form a seamless transition between the base 30 and the vertically extending wall 32. To that end, the lower end 42 may have a concave curve or flare. The lower end 42 also meets opposing ends of the upper periphery 44 on opposite sides of the vertically extending wall 32 near the left and right tabs 36A,B of the base 30.

The upper periphery 44 meets the overlap section 44 so as to form a seamless transition between the overlap section 44 and the vertically extending wall 32. To that end, the upper periphery 42 may have a convex curve or flare. The upper periphery 44 also meets opposing ends of the lower end 42 on opposite sides of the vertically extending wall 32 near the left and right tabs 36A,B of the base 30.

The overlap section 34 extends horizontally from the upper periphery 44 of the vertically extending wall 32 so as to cover a portion of the stringer 14A near the open end 24A. The overlap section 34 may have a contour corresponding to the shape of the middle portion 26 and left and right sides 28A,B of the stringer 14A. For example, the overlap section 34 may have a have a convex middle portion and concave left and right portions. In one embodiment, the overlap section 34 has a constant width such as 0.5 inches.

The end cap 16A may be fabricated separately and then co-bonded or secondarily bonded onto the panel 12. End cap fabrication may include additive manufacturing (i.e., 3D printing), injection molding, composite layup and cure, or any other suitable manufacturing method. The end cap 16A may also be configured to be co-cured onto the panel 12 via discrete plies of thermoset material.

The end caps 16A-D provide several advantages. For example, the end caps 16A-D overlap the stringers 14A,B and surrounding skin laminate of the panel 12 by a small amount to completely seal the open ends 24A,B of the stringers 14A,B. The end caps 16A-D protect the open ends 24A,B and the core (filler) material 22 from impact damage. The end caps 16A-D also keep moisture and debris out of the open ends 24A,B. The end caps 16A-D reduce peel-off stresses at the open ends 24A,B by carrying stresses therethrough. This eliminates the need for additional fasteners at the open ends 24A,B. The end caps 16A-D also eliminate the need to manufacture the open ends 24A,B to specific dimensions.

The above-described end caps 16A-D are components of aircraft panel assembly 10. However, the end caps 16A-D may be used in other stringer applications such as windmills, space vehicles, ballistics, marine vessels, race cars, buildings, art installations, and the like.

Although the invention has been described with reference to the embodiments illustrated in the attached drawing figures, it is noted that equivalents may be employed and substitutions made herein without departing from the scope of the invention as recited in the claims.

For instance, it should be noted that composite parts are typically formed from composite material, as is known in the art, which generally includes at least two constituent components—a reinforcement material and a matrix material. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. In the case of fiber-based reinforcement materials, the fiber may exist in one of at least two forms—either preimpregnated (prepreg), in which the fiber may be coated with a matrix material that is uncured and/or requires further heat treatment, such as uncured resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others. It should be noted that thermoplastic film adhesives are preferably incorporated between parts comprising thermosetting matrix materials, and that fixing one such part to another includes curing the thermoplastic film adhesives. It should also be noted that mixtures of composite materials may be used to form a single composite part without departing from the spirit of the present invention.

Having thus described various embodiments of the invention, what is claimed as new and desired to be protected by Letters Patent includes the following:

1. A stringer end cap for at least partially covering an open end of a stringer of a panel, the stringer end cap comprising:
   a vertically extending wall having an upper periphery and a lower end;
   an overlap section extending horizontally from the upper periphery of the vertically extending wall, the overlap section being configured to extend over a portion of the stringer near the open end; and
   a base extending horizontally from the lower end of the vertically extending wall, the base including two end tabs extending laterally from the lower ends of the overlap section and an intermediate section extending laterally between the two end tabs along the lower end of the vertically extending wall, the base being configured to be adjacent and bonded to the panel near the open end of the stringer,
   the overlap section being configured to be bonded to the stringer near the open end.

2. The stringer end cap of claim 1, wherein the vertically extending wall is angled in a direction of the overlap section.

3. The stringer end cap of claim 1, wherein the overlap section has a constant width.

4. The stringer end cap of claim 1, wherein the base has a chamfered edge.

5. The stringer end cap of claim 1, wherein the vertically extending wall has a vertical profile corresponding to a shape of the stringer.

6. The stringer end cap of claim 5, wherein the upper periphery of the vertically extending wall and the overlap section include a middle convex portion and left and right concave portions.

7. The stringer end cap of claim 1, wherein the stringer end cap is configured to be co-cured onto the panel via discrete plies of thermoset composite material.

8. The stringer of claim 1, wherein the stringer end cap is formed of a material selected from the group consisting of a thermoset material, a thermoplastic composite material, and a metallic material.

9. An aircraft panel assembly comprising:
   a composite panel;
   an open-ended stringer formed on the composite panel and filled with a core material; and
   a stringer end cap at least partially covering the open end of the stringer, the stringer end cap comprising:
   a vertically extending wall having an upper periphery and a lower end;
   an overlap section extending horizontally from the upper periphery of the vertically extending wall, the overlap section being configured to extend over the stringer near the open end; and
   a base extending horizontally from the lower end of the vertically extending wall, the base including two end tabs extending laterally from the lower ends of the overlap section and an intermediate section extending laterally between the two end tabs along the lower end of the vertically extending wall, the base being configured to be adjacent and bonded to the panel near the open end of the stringer,
   the overlap section being configured to be bonded to the stringer near the open end.

10. The aircraft panel assembly of claim 9, wherein the vertically extending wall is angled in a direction of the overlap section.

11. The aircraft panel assembly of claim 9, wherein the overlap section has a constant width.

12. The aircraft panel assembly of claim 9, wherein the base has a chamfered edge.

13. The aircraft panel assembly of claim 9, wherein the vertically extending wall has a vertical profile corresponding to a shape of the stringer.

14. The aircraft panel assembly of claim 13, wherein the upper periphery of the vertically extending wall and the overlap section include a middle convex portion and left and right concave portions.

15. The aircraft panel assembly of claim 9, wherein the stringer end cap is co-cured onto the panel via discrete plies of thermoset composite material.

16. A stringer end cap for at least partially covering an open end of a stringer of a panel, the stringer end cap comprising:
   a vertically extending wall having an upper periphery; and an overlap section extending horizontally from the upper periphery of the vertically extending wall, the overlap section being configured to extend over a portion of the stringer near the open end, the stringer end cap being configured to be co-cured onto the panel via discrete plies of thermoset composite material.

\* \* \* \* \*